United States Patent
Kakishima et al.

(10) Patent No.: US 9,240,831 B2
(45) Date of Patent: Jan. 19, 2016

(54) RADIO BASE STATION APPARATUS, RADIO COMMUNICATION SYSTEM AND RADIO COMMUNICATION METHOD

(71) Applicant: NTT DOCOMO, INC., Tokyo (JP)

(72) Inventors: Yuichi Kakishima, Tokyo (JP); Satoshi Nagata, Tokyo (JP); Hidekazu Taoka, Munich (DE); Katsutoshi Kusume, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/362,702

(22) PCT Filed: Nov. 16, 2012

(86) PCT No.: PCT/JP2012/079790
§ 371 (c)(1),
(2) Date: Jun. 4, 2014

(87) PCT Pub. No.: WO2013/084693
PCT Pub. Date: Jun. 13, 2013

(65) Prior Publication Data
US 2014/0362946 A1    Dec. 11, 2014

(30) Foreign Application Priority Data
Dec. 5, 2011    (JP) .................................. 2011-265749

(51) Int. Cl.
*H04L 27/00* (2006.01)
*H04B 7/06* (2006.01)
*H04B 7/04* (2006.01)

(52) U.S. Cl.
CPC ............ *H04B 7/0615* (2013.01); *H04B 7/0456* (2013.01); *H04B 7/0469* (2013.01); *H04B 7/065* (2013.01); *H04B 7/0617* (2013.01); *H04B 7/0691* (2013.01)

(58) Field of Classification Search
CPC .... H04B 7/0615; H04B 7/065; H04B 7/0469; H04B 7/0691; H04B 7/0456; H04B 7/0617
USPC .......................................................... 375/295
See application file for complete search history.

(56) References Cited

U.S. PATENT DOCUMENTS

| 7,903,753 B2 | 3/2011 | Lee et al. |
| 8,139,668 B2 | 3/2012 | Orlik et al. |

(Continued)

FOREIGN PATENT DOCUMENTS

| JP | 2008/085922 A | 4/2008 |
| JP | 2008-512032 A | 4/2008 |

(Continued)

OTHER PUBLICATIONS

International Search Report issued in PCT/JP2012/079790 mailed on Feb. 19, 2013 (4 pages).

(Continued)

*Primary Examiner* — Erin File
(74) *Attorney, Agent, or Firm* — Osha Liang LLP

(57) ABSTRACT

The present invention is designed to implement radio communication to maintain good communication quality even when the number of antennas provided in a radio base station apparatus is greater than the number of transmission layers of a downlink control channel, a broadcast channel, and cell-specific reference signals. When, from a radio base station apparatus (200) having a plurality of transmitting antennas, at least one of a downlink control channel, a broadcast channel and a cell-specific reference signal is transmitted with fewer transmission layers than the number of all transmitting antennas, a smaller number of antennas than the number of all transmitting antennas are made virtual in a precoding weight multiplication section (205), and also transmission weights that make the average transmission power of the transmitting antennas or transmission streams the same are multiplied, and the signals multiplied by the transmission weights are transmitted from the transmitting antennas on the downlink.

21 Claims, 10 Drawing Sheets

(56) References Cited

U.S. PATENT DOCUMENTS

| | | |
|---|---|---|
| 8,520,791 B2 | 8/2013 | Orlik et al. |
| 2010/0232384 A1* | 9/2010 | Farajidana et al. ........... 370/329 |
| 2011/0085587 A1* | 4/2011 | Moulsley et al. ............ 375/219 |
| 2011/0085618 A1* | 4/2011 | Zhuang et al. ................ 375/296 |
| 2011/0158340 A1* | 6/2011 | Swanson ...................... 375/267 |
| 2011/0212730 A1* | 9/2011 | Wennstrom et al. .......... 455/450 |
| 2012/0020236 A1 | 1/2012 | Wu |
| 2012/0106501 A1 | 5/2012 | Kishiyama et al. |
| 2012/0287965 A1* | 11/2012 | Sambhwani et al. ......... 375/141 |
| 2013/0051240 A1* | 2/2013 | Bhattad et al. ............... 370/241 |
| 2013/0195035 A1 | 8/2013 | Taoka et al. |
| 2013/0250789 A1* | 9/2013 | McWilliams et al. ........ 370/252 |
| 2013/0294369 A1* | 11/2013 | Dinan .......................... 370/329 |
| 2013/0308714 A1* | 11/2013 | Xu et al. ....................... 375/267 |
| 2014/0037019 A1* | 2/2014 | Akkarakaran et al. ....... 375/267 |
| 2014/0098689 A1* | 4/2014 | Lee et al. ..................... 370/252 |
| 2014/0219162 A1* | 8/2014 | Eyuboglu et al. ............ 370/315 |

FOREIGN PATENT DOCUMENTS

| | | |
|---|---|---|
| JP | 2010/124325 A | 6/2010 |
| JP | 2010-219817 A | 9/2010 |
| JP | 2010/288260 A | 12/2010 |
| JP | 2011-234265 A | 11/2011 |
| WO | 2010/101374 A2 | 9/2010 |
| WO | 2010/101374 A3 | 9/2010 |
| WO | 2010/119533 A1 | 10/2010 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN (Release 8)"; Dec. 2008 (18 pages).

* cited by examiner $$W = \begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \end{pmatrix}$$

FIG. 4A $$W = \begin{pmatrix} 1 & 1 & 0 & 0 & 0 & 0 & 0 & 0 \\ 0 & 0 & 1 & j & 0 & 0 & 0 & 0 \\ 0 & 0 & 0 & 0 & 1 & -1 & 0 & 0 \\ 0 & 0 & 0 & 0 & 0 & 0 & 1 & -j \end{pmatrix}$$

FIG. 4B $$W = \begin{pmatrix} 1 & e^{-j2\pi i/2} & 0 & 0 & 0 & 0 & 0 & 0 \\ 0 & 0 & 1 & e^{-j2\pi i/2} & 0 & 0 & 0 & 0 \\ 0 & 0 & 0 & 0 & 1 & e^{-j2\pi i/2} & 0 & 0 \\ 0 & 0 & 0 & 0 & 0 & 0 & 1 & e^{-j2\pi i/2} \end{pmatrix}$$

FIG. 4C $$W = \begin{pmatrix} 1 & e^{j\omega t} & 0 & 0 & 0 & 0 & 0 & 0 \\ 0 & 0 & 1 & e^{j\omega t} & 0 & 0 & 0 & 0 \\ 0 & 0 & 0 & 0 & 1 & e^{j\omega t} & 0 & 0 \\ 0 & 0 & 0 & 0 & 0 & 0 & 1 & e^{j\omega t} \end{pmatrix}$$

FIG. 4D $$W = \begin{pmatrix} 1/2 & 1/2 & 1/2 & 1/2 \\ 1/2 & 1/2 & 1/2 & -1/2 \\ 1/2 & 1/2 & -1/2 & 1/2 \\ 1/2 & 1/2 & -1/2 & -1/2 \\ 1/2 & -1/2 & 1/2 & 1/2 \\ 1/2 & -1/2 & 1/2 & -1/2 \\ 1/2 & -1/2 & -1/2 & 1/2 \\ 1/2 & -1/2 & -1/2 & -1/2 \end{pmatrix}$$

FIG. 5

RADIO BASE STATION APPARATUS, RADIO COMMUNICATION SYSTEM AND RADIO COMMUNICATION METHOD

TECHNICAL FIELD

The present invention relates to a radio base station apparatus, a radio communication system and a radio communication method. More particularly, the present invention relates to a radio base station apparatus, a radio communication system and a radio communication method that support multi-antenna transmission.

BACKGROUND ART

A communication scheme to be a successor of the wideband code-division-multiple access (WCDMA) scheme, the high-speed downlink packet access (HSDPA) scheme, the high-speed uplink packet access (HSUPA) scheme and so on—that is, long term evolution (LTE)—has been defined by the 3GPP, which is the standards organization of WCDMA (Release-8). As radio access schemes in release-8 LTE (hereinafter referred to as "Rel8-LTE"), an orthogonal frequency division multiple access (OFDMA) scheme is defined for the downlink, and a single-carrier frequency division multiple access (SC-FDMA) scheme is defined for the uplink.

The OFDMA scheme is a multi-carrier transmission scheme to perform transmission by dividing a frequency band into a plurality of narrow frequency bands (subcarriers) and placing data on each subcarrier. With this OFDMA scheme, high-speed transmission is made possible by arranging subcarriers on the frequency axis orthogonally and densely, and therefore the efficiency of use of frequency is expected to improve.

The SC-FDMA scheme is a single-carrier transmission scheme to divide a frequency band on a per terminal basis to allow a plurality of terminals to perform transmission using varying frequency bands. This SC-FDMA scheme is able to reduce interference between terminals easily and effectively, and, in addition, reduce the variation of transmission power, so that this scheme is preferable from the perspective of reducing the power consumption of terminals, expanding coverage and so on.

In Rel8-LTE, a downlink control channel (PDCCH: Physical Downlink Control Channel) is defined. The PDCCH is used to transmit control information, such as resource block (RB) allocation information of a downlink data channel, the modulation scheme/channel coding rate, retransmission information and transmission power control information.

Also, in Rel8-LTE, a broadcast channel (BCH: Broadcast Channel) is defined. The BCH is used to transmit broadcast information (the system bandwidth, the number of transmitting antennas at a base station, and so on) that is necessary to receive the above-described PDCCH.

Furthermore, in Rel8-LTE, cell-specific reference signals (CRSs) are defined. A CRS constitutes a cell-specific reference signal that is used, for example, in channel estimation and symbol synchronization for downlink coherent detection in a user terminal which supports Rel8-LTE (hereinafter referred to as "LTE terminal"). This CRS is used to decode the above-described PDCCH and BCH.

Also, in Rel8-LTE, a radio transmission method (MIMO: Multiple-Input Multiple-Output) to improve communication quality by providing a plurality of antennas in both the transmitter and the receiver is defined (for example, non-patent literature 1). MIMO may be divided between the case where layers (data streams) that are multiplexed over the same time/frequency all belong to the same user (single user MIMO) and the case where these layers belong to varying users (multi-user MIMO).

Single-user MIMO is able to perform space-multiplexing of four layers using maximum four transmitting antennas in a base station. The layers are not associated with the transmitting antennas on a one-by-one basis, but are transmitted from all of the transmitting antennas by applying a unique transmission phase/amplitude control (precoding) to each. Ideally, by precoding, layers that are transmitted at the same time are received on the receiver side being orthogonal to each other (that is, without interfering with each other). Consequently, the precoding weights (weighting of transmitting antennas) are determined, taking into account the fading variation, so that layers (data streams) that are transmitted at the same time do not interfere with each other and are received at an LTE terminal with a high SINR. Also, by precoding, beam forming to implement directional transmission that amplifies desired waves for specific user terminals is made possible.

Multi-user MIMO is made possible by allocating the same resource blocks (RBs) in a given subframe to the layers of a plurality of user terminals. In the event of multi-user MIMO, the number of layers to be allocated to each user is limited to one.

Regarding the transmission of the above-described PDCCH and BCH, Rel8-LTE supports four-antenna transmission at a maximum. To be more specific, an SFBC (Space Frequency Block Code) is applied upon two-antenna transmission, and an SFBC and FSTD (Frequency Shift Transmit Diversity) are applied upon four-antenna transmission. Also, as for CRSs, too, MIMO multiplexing of four-antenna transmission is supported at a maximum.

CITATION LIST

Non-Patent Literature

Non-patent literature 1: 3GPP TR 25.913 [1]

In the above-described system of the LTE (Rel8-LTE) scheme, it is possible to achieve a transmission rate of about maximum 300 Mbps on the downlink and about 75 Mbps on the uplink by using a variable band which ranges from 1.4 MHz to 20 MHz. Furthermore, in a UMTS network, successor systems of LTE are under study (for example, LTE-Advanced (LTE-A)) for the purpose of achieving further broadbandization and higher speed. For example, in LTE-A, there is a plan to expand the maximum system band for LTE specifications, which is 20 MHz, to approximately 100 MHz.

Also, in LTE specifications, the maximum number of transmitting antennas, which is four antennas according to LTE specifications, is expanded to eight antennas. That is, LTE-A is planned to operate a radio base station apparatus having eight antennas, and support eight-antenna transmission at a maximum with respect to the transmission of user data and so on. However, as for the transmission of the PDCCH, the BCH and CRSs, LTE-A only provides for four-antenna transmission (four-layer transmission) at a maximum.

The present invention has been made in view of the above, and it is therefore an object of the present invention to provide a radio base station apparatus, a radio communication method and a radio communication system that can implement radio communication to maintain good transmission quality even when the number of antennas provided in a radio base station apparatus is greater than the number of transmission layers of a downlink control channel, a broadcast channel and cell-specific reference signals.

SUMMARY OF THE INVENTION

A radio base station apparatus according to the present invention has a plurality of transmitting antennas, a weight multiplication section that, when at least one of a downlink control channel, a broadcast channel and a cell-specific reference signal is transmitted with fewer transmission layers than the number of all transmitting antennas, makes a smaller number of antennas than the number of all transmitting antennas virtual, and also multiplies transmission weights that make the average transmission power of the transmitting antennas or transmission streams the same, and a transmission section that transmits signals multiplied by the transmission weights in the weight multiplication section from the transmitting antennas.

A radio communication system according to the present invention includes a radio base station apparatus having a plurality of transmitting antennas, a weight multiplication section that, when at least one of a downlink control channel, a broadcast channel and a cell-specific reference signal is transmitted with fewer transmission layers than the number of all transmitting antennas, makes a smaller number of antennas than the number of all transmitting antennas virtual, and also multiplies transmission weights that make the average transmission power of the transmitting antennas or transmission streams the same, and a transmission section that transmits signals multiplied by the transmission weights in the weight multiplication section from the transmitting antennas, and a mobile station apparatus having a receiving section that receives the signals from the radio base station apparatus, and a downlink channel demultiplexing section that demultiplexes the received signals received in the receiving section, into the reference signal, the control channel and the broadcast channel.

A radio communication method according to the present invention includes the steps of, when, from a radio base station apparatus having a plurality of transmitting antennas, at least one of a downlink control channel, a broadcast channel and a cell-specific reference signal is transmitted with fewer transmission layers than the number of all transmitting antennas, making a smaller number of antennas than the number of all transmitting antennas virtual, and also multiplying transmission weights that make the average transmission power of the transmitting antennas or transmission streams the same, and transmitting signals multiplied by the transmission weights from the transmitting antennas.

According to the present invention, it is possible to implement radio communication to maintain good transmission quality, without applying significant limitations to the transmission amplifiers, even when the number of antennas provided in a radio base station apparatus is greater than the number of transmission layers of a downlink control channel, a broadcast channel and cell-specific reference signals.

BRIEF DESCRIPTION OF THE DRAWINGS

FIG. 4 provides diagrams to explain examples of first transmission weights (weight matrix W);

FIG. 5 is a diagram to explain an example of second transmission weights (weight matrix W);

DESCRIPTION OF EMBODIMENTS

As described above, in radio communication systems that are under study as successor systems of LTE (for example, a system of the LTE-A scheme), there is a plan to operate a radio base station apparatus (hereinafter simply referred to as "base station") eNB having eight antennas, and support eight-antenna transmission at a maximum with respect to the transmission of user data and so on. However, regarding the transmission of the PDCCH, the BCH and CRSs, the LTE-A system only provides for four-layer transmission at a maximum.

Given the circumstance, the following two methods are possible methods of transmitting the PDCCH, the BCH and CRSs from a base station eNB having eight antennas. First is the method of providing four specific antennas out of eight antennas with transmission amplifiers of higher power than those of the other four antennas, and performing transmission from the four specific antennas (the first method). Second is the method of performing transmission from four arbitrary antennas, without changing the power of the transmission amplifiers (that is, eight antennas are provided with transmission amplifiers of equal power) (the second method).

Figure 1A:
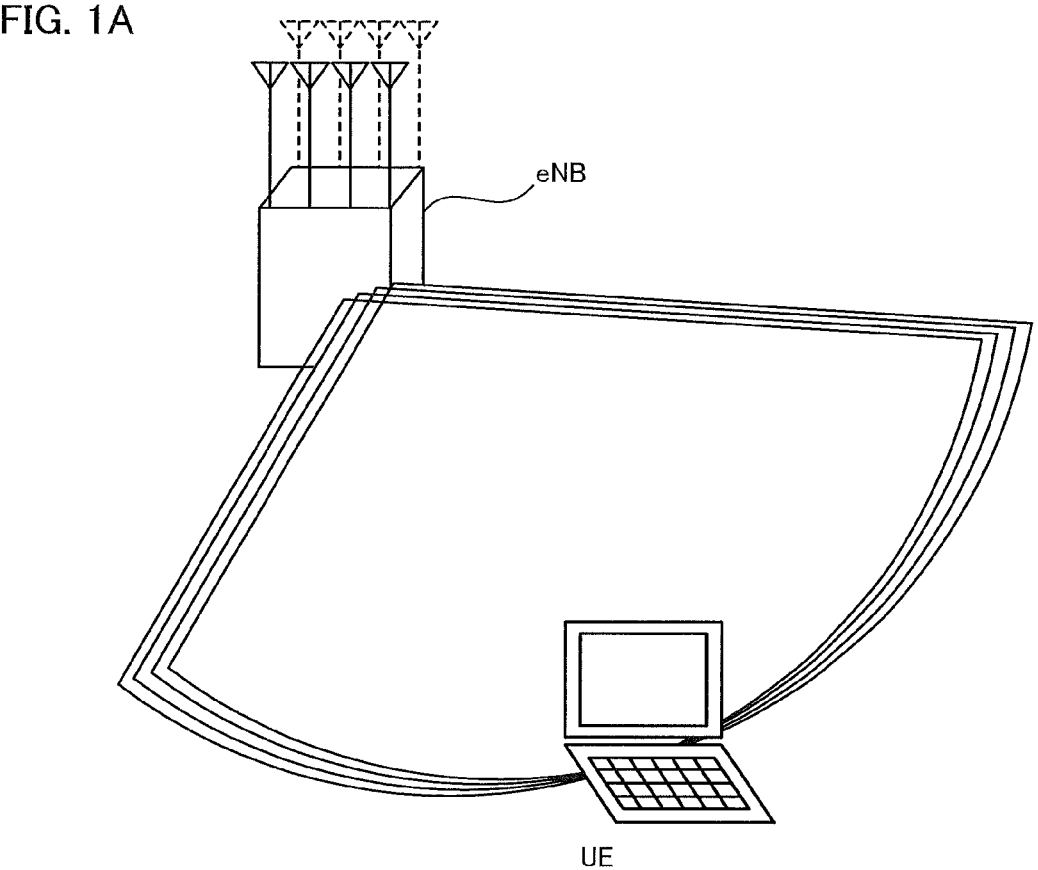
FIGS. 1A and 1B provide diagrams to explain examples of transmitting a PDCCH and so on from a radio base station apparatus having eight antennas.
Figure 1B:
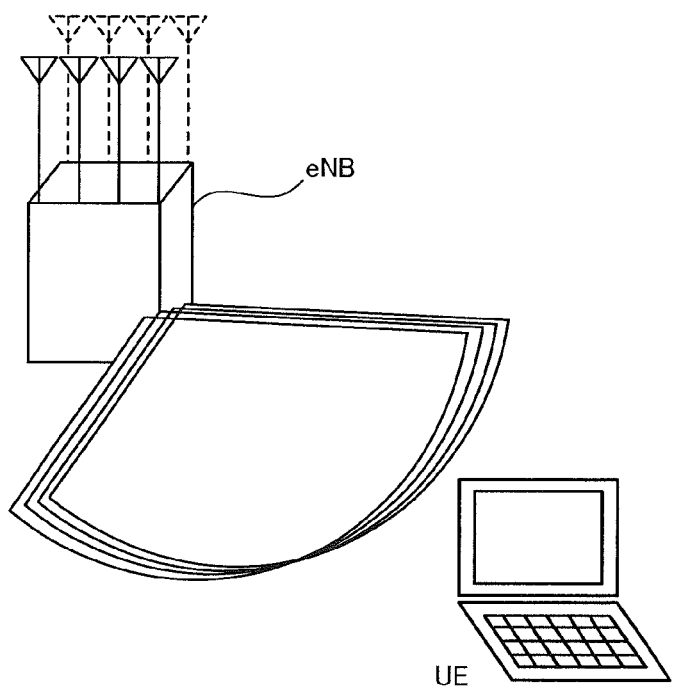

With the first method, as shown in FIG. 1A, coverage is secured by transmitting the PDCCH, the BCH and CRSs from four specific antennas that are associated with high-power transmission amplifiers. However, there is a problem that imbalance is introduced between transmitting antennas, and the transmission amplifier design and transmission control become complex. With the second method, as a result of making the transmission power of the PDCCH, the BCH and CRSs a half, as shown in FIG. 1B, the coverage becomes smaller. This results in a problem that, for example, necessary information cannot be provided to user equipment UE at cell edges, and the overall throughput performance of the system decreases.

Now, in recent years, an antenna virtualization technique to perform transmission using a different number of virtual antennas from the actual number of antennas, by precoding and transmitting signals from each transmitting antenna of a transmitter (for example, a base station eNB). The present inventors have focused on the fact that desirable throughput performance can be secured by applying this antenna virtualization technique to the transmission of physical channels such as the PDCCH, the BCH and CRSs, without causing the problem of imbalance between transmitting antennas and the problem of reduced coverage, and arrived at the present invention.

Figure 2:
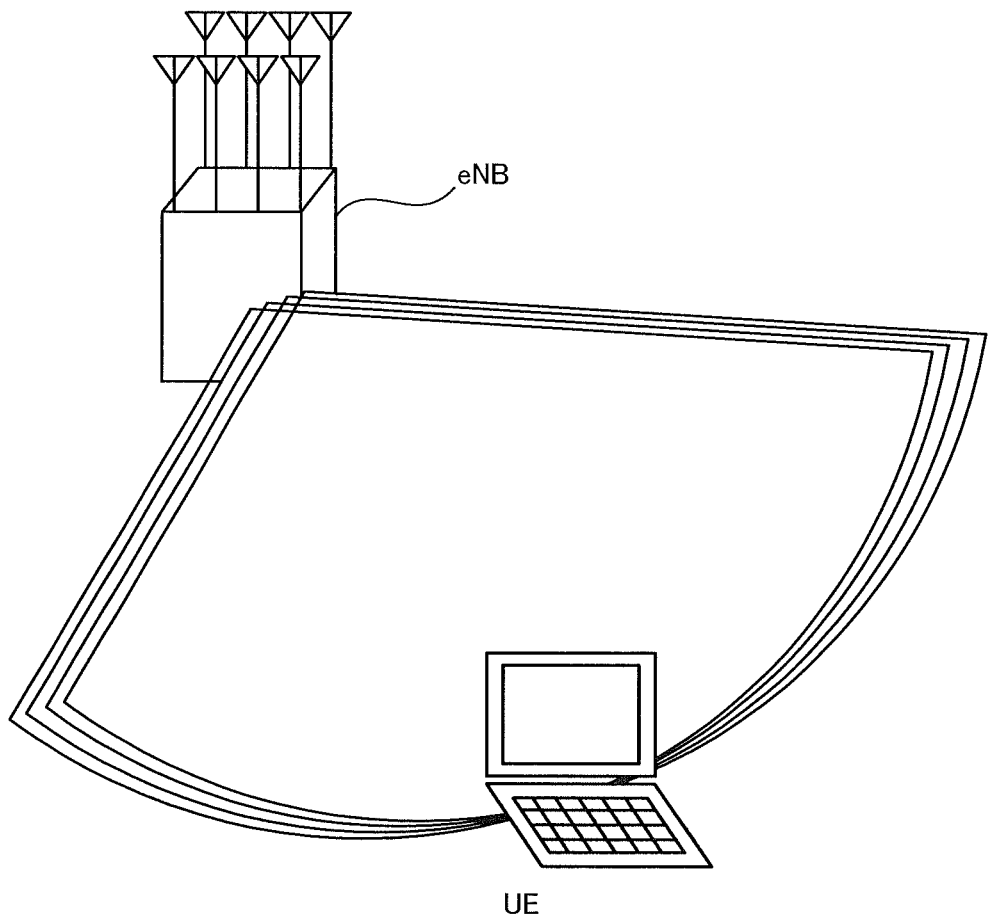
FIG. 2 is a diagram to explain an example of transmitting a PDCCH and so on by applying antenna virtualization according to the present invention.

That is, a gist of the present invention is that, for the transmission of the PDCCH, the BCH and CRSs, as shown in FIG. 2, although transmission signals to be transmitted from a plurality of transmitting antennas (for example, eight antennas and four antennas) provided in a base station eNB are multiplied by precoding weights and transmitted using, physically, all of the transmitting antennas, the signals are transmitted by making a smaller number of antennas (for example, four antennas and two antennas) than the number of all transmitting antennas virtual antennas. Note that the PDCCH and the BCH are demodulated using CRSs, so that, when implementing antenna virtualization, these physical channels are multiplied by the same precoding weight.

Figure 3:
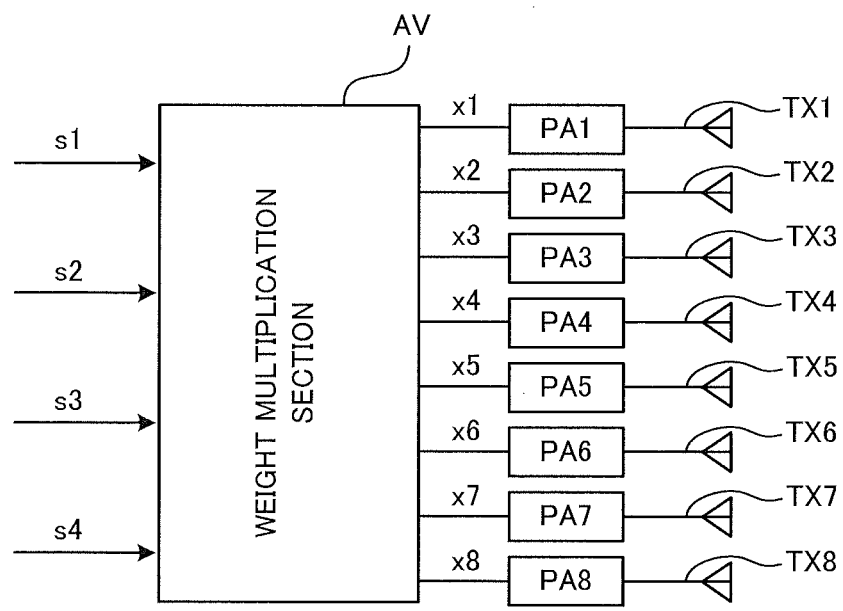
FIG. 3 is a diagram to explain a schematic configuration of a transmission section in a radio base station apparatus according to the present invention.

FIG. 3 is a diagram to explain a schematic configuration of a transmission section in a base station eNB according to the present invention. FIG. 3 shows a case where the base station eNB has eight transmitting antennas TX1 to TX8, where these transmitting antennas TX1 to TX8 are connected to an antenna virtualization weight multiplication section AV (hereinafter simply referred to as "weight multiplication section") via transmission amplifiers PA1 to PA8. Note that FIG. 3 shows a case where, for ease of explanation, the PDCCH, the BCH and CRSs are input in the weight multiplication section AV as transmission signals s1 to s4 of four layers. The transmission signals s1 to s4 may also be referred to as "transmission streams s1 to s4."

In the configuration of the transmission section shown in FIG. 3, four transmission signals s1 to s4 are multiplied by transmission weights (precoding weights) that are determined in advance in the weight multiplication section AV, and modified to eight signals x1 to x8. The modified eight signals x1 to x8 are input in transmission amplifiers PA1 to PA8 and amplified, and output to user equipment UE on the downlink via the transmitting antenna TX1 to TX8.

That is, in the transmission section shown in FIG. 3, by multiplying the transmission signals s1 to s4 by transmission weights that are determined in advance in the weight multiplication section AV and applying weights on a per transmission stream basis, physically, the signals are transmitted using the transmitting antenna TX1 to TX8, but antenna virtualization to a smaller number of antennas (here, four antennas) than all of the transmitting antennas TX1 to TX8 is implemented.

To represent the signal processing in the transmission section shown in FIG. 3, the following equation 1 holds:

$$x = Ws \quad \text{(Equation 1)}$$

where x is the matrix to correspond to the signals modified in the weight multiplication section AV (hereinafter referred to as "modified signal matrix"), W is the matrix to correspond to the transmission weights in the weight multiplication section AV (hereinafter referred to as "weight matrix"), and s is the matrix to correspond to the transmission signals to be input in the weight multiplication section AV (hereinafter referred to as "transmission signal matrix").

In this case, the transmission signal matrix s, the weight matrix W and the modified signal matrix x are represented by following equation 2, equation 3 and equation 4, respectively:

$$s \in C^{St \times 1} \quad \text{(Equation 2)}$$

$$W \in C^{Mt \times St} \quad \text{(Equation 3)}$$

$$x \in C^{Mt \times 1} \quad \text{(Equation 4)}$$

That is, referring to the example shown in FIG. 3, the transmission signal matrix s is a matrix of four rows×one column (that is, St=4), the weight matrix W is a matrix of eight rows×four columns (that is, Mt=8), and the modified signal matrix x is a matrix of eight rows×one column.

For example, the weight multiplication section AV is able to apply transmission weights that make the average transmission power of the transmitting antennas TX1 to TX8 the same. In this case, the performance of the transmission amplifiers PA1 to PA8 corresponding to the transmitting antennas TX1 to TX8 can be utilized to a full extent, so that it is possible to achieve a transmission diversity effect without a decrease in the rate of operation of the transmission amplifiers PA1 to PA8. As a result of this, it is still possible to implement radio communication to maintain good transmission quality even when the number of transmitting antennas provided in the base station eNB is greater than the number of transmission layers of the PDCCH, the BCH or CRSs.

Also, the weight multiplication section AV is able to apply transmission weights that make the average transmission power of the transmission streams (that is, the transmission signal s1 to s4) the same. In this case, all transmission streams can be transmitted with nearly equal communication quality, so that it is possible to prevent the situation where specific transmission streams are not delivered due to fading variation and so on, and achieve a transmission diversity effect. As a result of this, it is still possible to implement radio communication to maintain good transmission quality even when the number of transmitting antennas provided in the base station eNB is greater than the number of transmission layers of the PDCCH, the BCH or CRSs.

Now, specific examples of the transmission weights (weight matrix W) by which transmission signals (transmission signal matrix s) are multiplied in the weight multiplication section AV will be described. For ease of explanation, the following description will illustrate a case where, as shown in FIG. 3, the PDCCH, the BCH or CRSs are transmitted from eight transmitting antennas TX1 to TX8 of a base station eNB.

The first transmission weights define the matrix elements such that transmission streams are transmitted from a plurality of transmitting antenna TX1 to TX8 that do not overlap between the streams. With the first transmission weights, the case of transmitting the same signal having equal amplitude and phase from a plurality of transmitting antennas that transmit the same transmission stream (transmission weights (1-1)), and the case of applying an amplitude variation and/or a phase shift to signals from a plurality of transmitting antennas that transmit the same transmission stream (transmission weights (1-2)), are possible. In particular, with the transmission weights (1-2), the case of applying an amount of amplitude variation and phase shift that is fixed in time (transmission weights (1-2-1)), and the case of switching the amount of amplitude variation and phase shift randomly or periodically over time (transmission weights (1-2-2)), are possible. With the first transmission weights, the matrix elements are defined such that transmission streams are transmitted from a plurality of transmitting antenna TX1 to TX8 that do not overlap between the streams, so that it is possible to implement antenna virtualization without requiring complex control in the base station eNB.

FIG. 4 provides diagrams to explain examples of the first transmission weights (weight matrix W). FIG. 4A shows an example of the transmission weights (1-1), and FIG. 4B shows an example of the transmission weights (1-2). Also, FIG. 4C shows an example of the transmission weights (1-2-1), and FIG. 4D shows an example of the transmission weights (1-2-2). Note that, in FIG. 4, the rows in each weight matrix W correspond to transmission streams (transmission signals s1 to s4), and the columns in each weight matrix W correspond to transmitting antennas TX1 to TX8. The same applies to the transmission weights shown in FIG. 5.

In the transmission weights (1-1) shown in FIG. 4A, the matrix elements are defined such that the transmission signal s1 is transmitted from the transmitting antennas TX1 and TX5, the transmission signal s2 is transmitted from the transmitting antennas TX2 and TX6, the transmission signal s3 is transmitted from the transmitting antennas TX3 and TX7, and the transmission signal s4 is transmitted from the transmitting antennas TX4 and TX8. Note that the amplitude and phase to be applied to the transmission signals s1 to s4 are set the same. With the transmission weights (1-1), the same signal having equal amplitude and phase are transmitted from a plurality of transmitting antennas that transmit the same transmission stream, so that it is possible to implement antenna virtualization by performing simple signal processing in the base station eNB, and also achieve space diversity gain.

With the transmission weights (1-2) shown in FIG. 4B, the matrix elements are defined such that the transmission signal s1 is transmitted from the transmitting antennas TX1 and TX2, the transmission signal s2 is transmitted from the transmitting antennas TX3 and TX4, the transmission signal s3 is transmitted from the transmitting antennas TX5 and TX6, and the transmission signal s4 is transmitted from the transmitting antennas TX7 and TX8. Also, while the amount of amplitude variation and phase shift to be applied to the transmission signal s1 is set to the same value between the transmitting antennas TX1 and TX2, the amount of amplitude variation and phase shift to be applied to the transmission signal s2 is set to different values (fixed values) between the transmitting antennas TX3 and TX4. As for the amounts of amplitude variation and phase shift to be applied to the transmission signals s3 and s4, similar to the amount of amplitude variation and phase shift to be applied to the transmission signal s2, different values (fixed value) are set between the transmitting antennas TX5 and TX6 and between the transmitting antennas TX7 and TX8. With the transmission weights (1-2), signals from plurality of transmitting antennas that transmit the same transmission stream are applied an amplitude variation and/or a phase shift and transmitted, so that it is possible to improve the diversity gain without requiring complex signal processing in the base station eNB.

Also, in the transmission weights (1-2-1) shown in FIG. 4C, the matrix elements are defined such that the transmission signal s1 is transmitted from the transmitting antennas TX1 and TX2, the transmission signal s2 is transmitted from the transmitting antennas TX3 and TX4, the transmission signal s3 is transmitted from the transmitting antennas TX5 and TX6, and the transmission signal s4 is transmitted from the transmitting antennas TX7 and TX8. Also, the amount of amplitude variation and phase shift for the signal from one of the transmitting antennas (transmitting antenna TX2) to transmit the transmission signal s1 is fixed in time, with respect to the amount of amplitude variation and phase shift in the other transmitting antenna (transmitting antenna TX1). The same applies to the transmission signal s2, s3 and s4. Note that, in FIG. 4C, i is the index to designate the amount of phase shift. With the transmission weights (1-2-1), signals from a plurality of transmitting antennas that transmit the same transmission stream are applied an amount of amplitude variation and phase shift that is fixed in time, and transmitted, so that it is possible to improve the diversity gain.

The transmission weights (1-2-2) shown in FIG. 4D are different from the transmission weights (1-2-1) shown in FIG. 4C in that the amounts of amplitude variation and phase shift for the signals from one side of the transmitting antennas (transmitting antennas TX2, TX4, TX6 and TX8) that transmit the transmission signals s1 to s4 are switched randomly or periodically over time with respect to the amounts of amplitude variation and phase shift in the other transmitting antennas (transmitting antennas TX1, TX3, TX5 and TX7). Note that, in FIG. 4D, w is the angular velocity to designate the amount of phase shift, and t is the index to designate time. With the transmission weights (1-2-2), signals from a plurality of transmitting antennas that transmit the same transmission stream are applied an amount of amplitude variation and phase shift that is switched randomly or periodically over time, and transmitted, and, given that the amounts of amplitude variation and phase shift can be switched as time passes, the diversity gain can be improved even more. Note that although a case has been described above where the transmission weights are switched over time, it is equally possible to switch the transmission weights over frequency. In this case, frequency diversity can be achieved.

The second transmission weights define the matrix elements such that transmission streams are transmitted from a plurality of transmitting antennas TX1 to TX8 by tolerating overlaps between the streams. With the second transmission weights, the case of transmitting mutually orthogonal signals in transmission streams (transmission weights (2-1)) may be possible. In particular, with the transmission weights (2-1), the case of applying an amount of amplitude variation and phase shift that is fixed in time (transmission weights (2-1-1)), and the case of switching the amount of amplitude variation and phase shift randomly or periodically over time (transmission weights (2-1-2)), may be possible. With the second transmission weights, the matrix elements are defined to transmit transmission streams from a plurality of transmitting antenna TX1 to TX8 by tolerating overlaps between the streams, so that, even when transmission characteristics from the transmitting antennas are deteriorated, it is still possible to prevent the situation where user equipment UE is unable to receive specific transmission streams.

FIG. 5 is a diagram to explain an example of the second transmission weights (weight matrix W). FIG. 5 shows an example of transmission weights (2-1) (to be more specific, an example of transmission weights (2-2-1)).

In the transmission weights (2-1) shown in FIG. 5, the matrix elements are defined such that all transmission streams (transmission signals s1 to s4) are transmitted from all of the transmitting antennas TX1 to TX8. Also, in the transmission weights (2-1) shown in FIG. 5, the matrix elements are defined such that signals from the transmitting antennas TX1 to TX8 become orthogonal. With the transmission weights (2-1), the matrix elements are defined such that signals from the transmitting antennas TX1 to TX8 become orthogonal, so that it is possible to prevent the situation where transmission streams interfere with each other, and improve the diversity gain.

In particular, with the transmission weights (2-1-1), signals from a plurality of transmitting antennas that transmit the same transmission stream are applied an amount of amplitude variation and phase shift that is fixed in time, and transmitted, so that it is possible to improve the diversity gain. With the transmission weights (2-1-2), signals from a plurality of transmitting antennas that transmit the same transmission stream are applied an amount of amplitude variation and phase shift that is switched randomly or periodically over time, and transmitted, and, given that the amounts of amplitude variation and phase shift can be switched as time passes, the diversity gain can be improved even more. Note that although a case has been described above where the transmission weights are switched over time, it is equally possible to switch the transmission weights over frequency. In this case, frequency diversity can be achieved.

The third transmission weights define the matrix elements such that an amount of amplitude variation and phase shift to support BPSK (Binary Phase Shift Keying) or QPSK (Quadrature Phase Shift Keying) between the base station eNB and user equipment UE is applied to each transmission stream. With the third transmission weights, it is possible to achieve a transmission diversity effect, without increasing the load of the signal processing required in the base station eNB upon multiplication of the transmission weights, by using simple codes such as BPSK and QPSK.

The fourth transmission weights define matrix elements to be defined in codebooks that are used for the precoding of a downlink shared channel signal (PDSCH: Physical Downlink Shared Channel) in a MIMO system of an LTE-A scheme. With the fourth transmission weights, it is possible to improve the high directivity gain and feedback rate which the codebooks used for the precoding of the PDSCH in the MIMO system of an LTE-A scheme have.

In the MIMO system of an LTE-A scheme, as a technique to anticipate reduced quantization error in the quantization process in user equipment UE upon MU-MIMO transmission, and a decrease in the amount of feedback information for the base station eNB, the method of providing both user equipment UE and the base station eNB with two codebooks (hereinafter referred to as "double codebook" whenever adequate), and feeding back feedback information including PMIs (Precording Matrix Indicators), for different communication bands, in different cycles, is under study.

In a MIMO system to utilize this double codebook, there is a plan to use one codebook as a first codebook for a long cycle/wide band (hereinafter referred to as "codebook W1"), and also use the other codebook as a second codebook for a short cycle/narrow band (hereinafter referred to as "codebook W2"). In this MIMO system, it is possible to increase the effective codebook size by providing two codebooks W1 and W2, so that the amount of quantization error in the quantization process in user equipment UE is expected to decrease. Also, given that, with the codebook W1, it is not necessary to feed back feedback information frequently compared to the codebook W2, feedback information is expected to be reduced.

With the fourth transmission weights, antenna virtualization is implemented by performing precoding of each transmission stream using these codebooks W1 and W2. In this case, with the fourth transmission weights, the case of applying the codebooks W1 and W2 by circulating both of the codebooks W1 and W2 in time or in frequency (transmission weights (4-1)), and the case of applying the codebooks W1 and W2 by fixing the codebook W1 in time or in frequency and by circulating the codebook W2 in time or in frequency (transmission weights (4-2)), may be possible.

With the transmission weights (4-1), it is not necessary to define new transmission weights to implement antenna virtualization, and furthermore it is possible to achieve a transmission diversity effect equal to that upon transmission of the PDSCH. Also, with the transmission weights (4-2), in addition to the above-described advantage, it is also possible to reduce the load of the signal processing required in the base station eNB upon multiplication of the transmission weights. Generally speaking, in a base station eNB where the range for accommodating user equipment UE is sectorized, the matrix elements to be defined in the codebook W1 are fixed to a certain extent. Consequently, when applying the codebooks by circulating the codebook W2 alone in time or in frequency, as is the case with the transmission weights (4-2), it is also possible to reduce the load of the signal processing required in the base station eNB upon multiplication of the transmission weights, and furthermore achieve a transmission diversity effect equal to that upon transmission of the PDSCH.

Note that it is not only possible to multiply the transmission signals s1 to s4 by the above-described first to fourth transmission weights, but it is also possible to apply cyclic delay diversity (CDD), per transmission beam that is output from the transmitting antennas TX1 to TX8. Here, CDD refers to the scheme of achieving frequency diversity while preventing inter-symbol interference, by applying different amounts of cyclic delay to the same signal between transmitting antennas and transmitting the signal. Note that CDD can be applied by, for example, adjusting the transmission weights that are multiplied in the weight multiplication section AV. In this way, by applying CDD to every transmission beam that is output from the transmitting antennas TX1 to TX8, it is possible to achieve frequency diversity while preventing inter-symbol interference, so that diversity gain can be achieved between transmission streams.

To represent the signal processing in the transmission section of the base station eNB in this case in an equation, following equation 5 holds:

$$x = WVs \qquad \text{(Equation 5)}$$

where V is the matrix that shifts, per transmitting antenna, the transmission timing of transmission beams to be output from the transmitting antenna TX1 to TX8. In this case, the matrix V can be represented by following equation 6:

$$V = \mathrm{diag}(e^{-2\pi j 0/n}, e^{-2\pi j 1/n}, \ldots, e^{-j\pi j(n-1)/n}) \qquad \text{(Equation 6)}$$

In the above-described first to fourth transmission weights, two arbitrary transmitting antennas out of a plurality of transmitting antennas TX1 to TX8 are selected as an antenna virtualization combination and transmit the same transmission stream. When selecting an antenna virtualization combination, the following two methods are applicable, from the perspective of improving the transmission diversity gain.

Figure 6A:
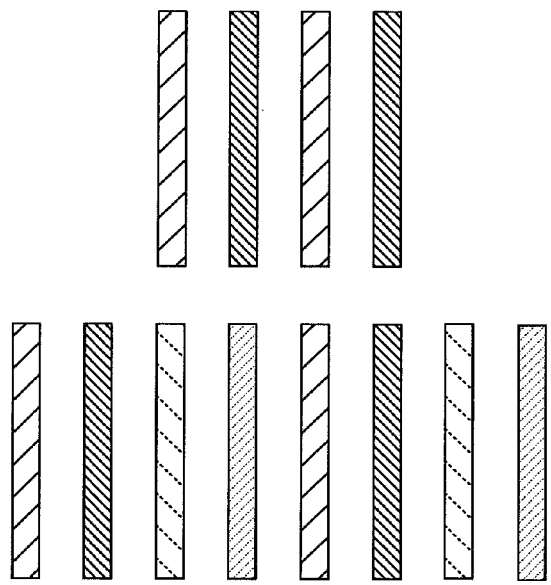
FIG. 6 provides diagrams to explain transmitting antennas, where transmitting antennas having low correlation with each other are selected as antenna virtualization combinations.
Figure 6B:
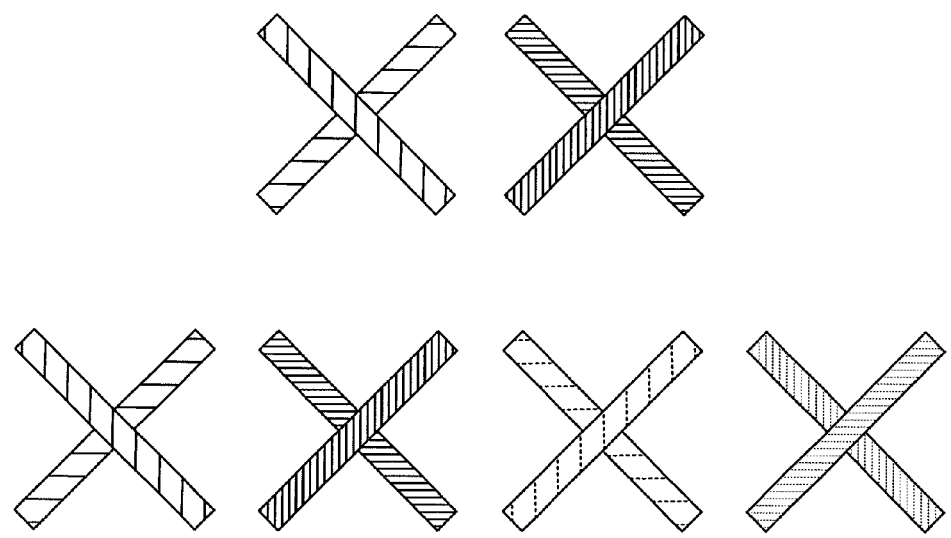

As a first selection method, the method of selecting transmitting antennas having low correlation with each other as an antenna virtualization combination may be possible. With the first selection method, for example, as shown in FIG. 6A, the case of selecting a plurality of antenna elements that are physically apart in a linear polarization antenna as an antenna virtualization combination, and as shown in FIG. 6B, the case of selecting one or a plurality of different polarization elements in an orthogonal polarization antenna as an antenna virtualization combination, may be possible.

When selecting an antenna virtualization combination by the first selection method, it is possible to reduce occurrence of interference between the same transmission streams, so that the transmission diversity gain can be improved.

Figure 7A:
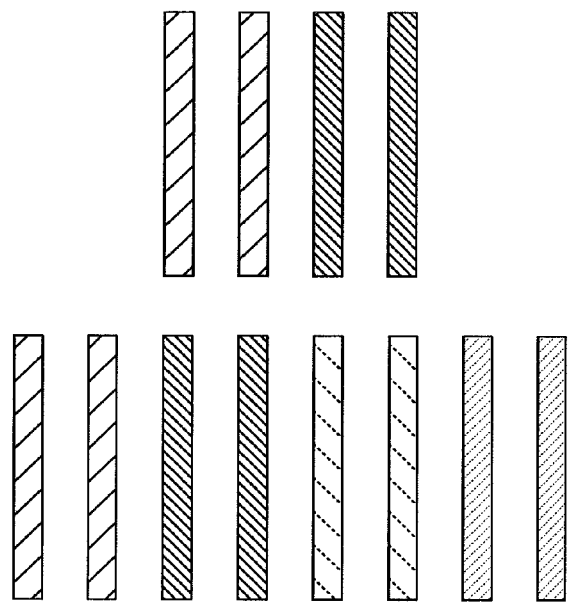
FIG. 7 provides diagrams to explain transmitting antennas, where transmitting antennas having high correlation with each other are selected as antenna virtualization combinations.
Figure 7B:
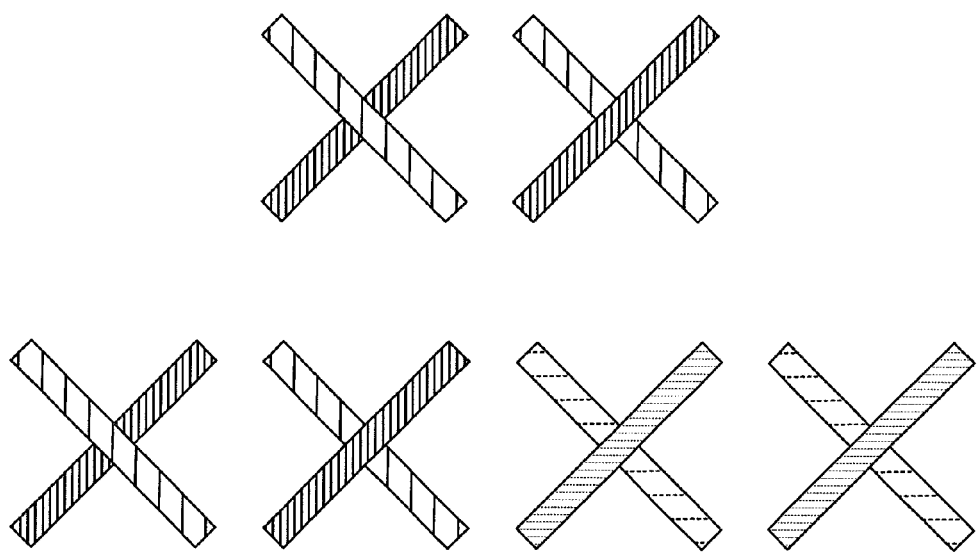

Also, as a second selection method, the method of selecting transmitting antennas having high correlation with each other as an antenna virtualization combination may be possible. With the second selection method, for example, as shown in FIG. 7A, the case of selecting a plurality of antenna elements that are physically close in a linear polarization antenna as an antenna virtualization combination, and as shown in FIG. 7B, the case of selecting one or a plurality of the same polarization elements in an orthogonal polarization antenna as an antenna virtualization combination, may be possible.

When selecting an antenna virtualization combination by the second selection method, it is possible to improve the transmission diversity gain.

Next, an embodiment of a radio communication method to implement antenna virtualization using the above-described transmission weights, and a radio base station apparatus (base station apparatus) and a mobile station apparatus (mobile station) to which this radio communication method is applied, will be described. Although a radio access system designed for LTE and LTE-A will be described as an example, this by no means limits applications to other systems.

Figure 8:
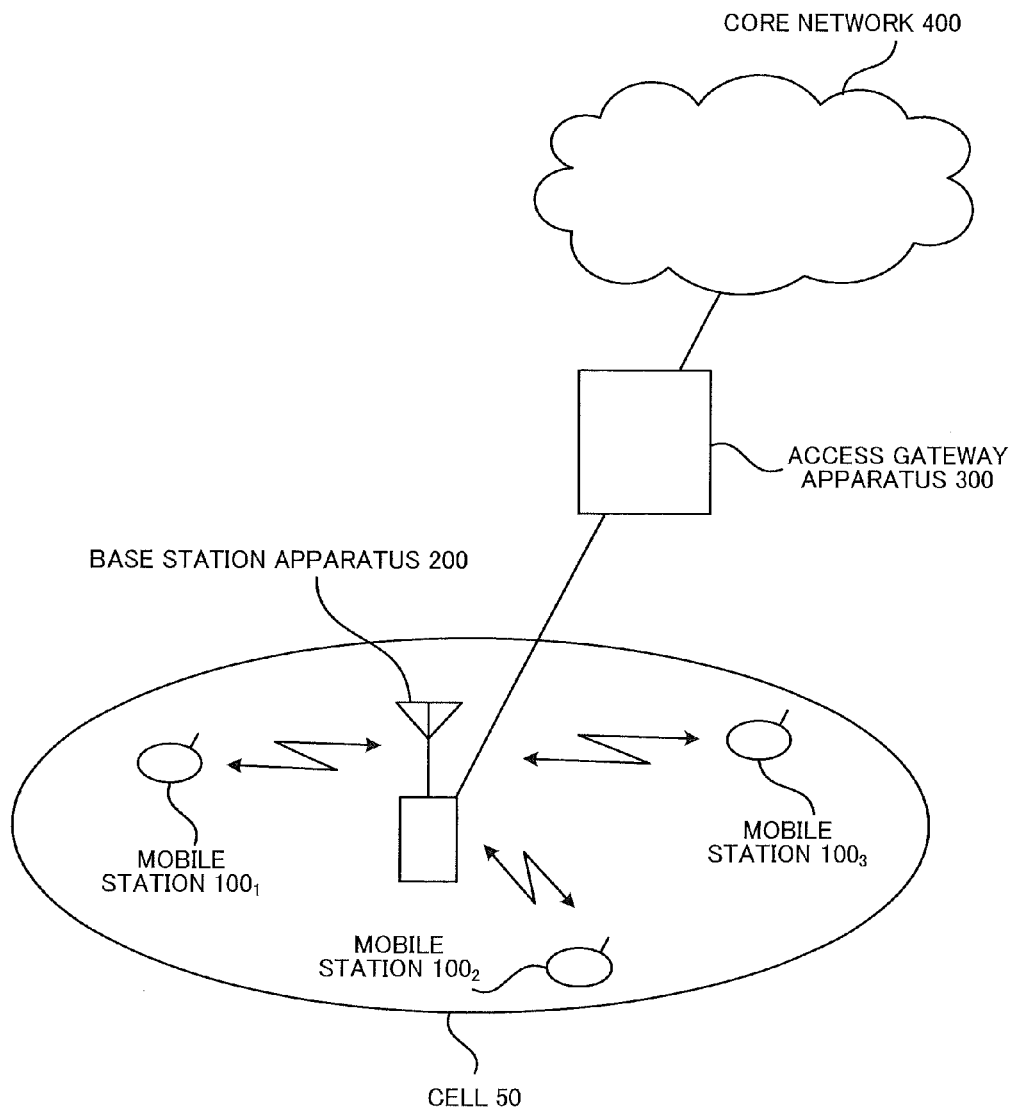
FIG. 8 is a diagram to explain a configuration of a radio communication system where a radio communication method according to the present invention is applied.

FIG. 8 is a diagram to explain a configuration of a radio communication system where the radio communication method according to the present invention is applied. As shown in FIG. 8, a radio communication system 1000 is based on an LTE system, and has a base station apparatus 200, and a plurality of mobile stations 100 ($100_1$, $100_2$, $100_3$, ... $100n$, where is an integer to satisfy n>0) that communicate with the base station apparatus 200. The base station apparatus 200 is connected with a higher station—for example, an access gateway apparatus 300—and the access gateway apparatus 300 is connected with a core network 400. The mobile station $100n$ communicates with the base station apparatus 200 in a cell 50 by LTE. Note that the above access gateway apparatus 300 may be referred to as "MME/SGW" (Mobility Management Entity/Serving Gateway) as well.

The mobile stations ($100_1$, $100_2$, $100_3$, ... $100n$) have the same configuration, functions and state, and therefore will be described simply as "mobile station $100n$" in the following description, unless specified otherwise. Also, although, for ease of explanation, mobile stations perform radio communication with the base station apparatus, more generally, user equipment (UE) to include both mobile terminals and fixed terminals may be used as well.

In the radio communication system 1000, as radio access schemes, OFDMA (Orthogonal Frequency Division Multiple Access) is applied to the downlink, and SC-FDMA (Single-Carrier Frequency-Division Multiple Access) is applied to the uplink. As noted earlier, OFDMA is a multi-carrier transmission scheme to perform communication by dividing a frequency band into a plurality of narrow frequency bands (sub-carriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE system will be described. On the downlink, reference signals, a physical downlink shared channel (PDSCH) that is shared by each mobile station $100n$, and a physical downlink control channel (downlink L1/L2 control channel) are used. CRSs, CSI-RSs and DM-RSs are transmitted by the reference signals. By the physical downlink shared channel, user data signals are transmitted. By the physical downlink control channel, DM-RS sequence information, scheduling information, information about user IDs communicating using the physical downlink shared channel and the transport format of that user data (that is, downlink scheduling information), information about user IDs communicating using a physical uplink shared channel and the transport format of that user data (that is, uplink scheduling grant) and so on are reported.

Also, on the downlink, broadcast channels such as a physical-broadcast channel (P-BCH) and a dynamic broadcast channel (D-BCH) are transmitted. Information that is transmitted through the P-BCH is master information blocks (MIBs), and information that is transmitted through the D-BCH is system information blocks (SIBs). The D-BCH is mapped to the PDSCH, and transmitted to the mobile station $100n$ by the base station apparatus 200.

On the uplink, a physical uplink shared channel (PUSCH) that is used by each mobile station 100 on a shared basis, and a physical uplink control channel (PUCCH), which is an uplink control channel, are used. By the physical uplink shared channel, user data is transmitted. By the physical uplink control channel, precoding information for downlink MIMO transmission, delivery acknowledgement information for the downlink shared channel, downlink radio quality information (CQI: Channel Quality Indicator) and so on are transmitted.

Also, on the uplink, a physical random access channel (PRACH) for initial access and so on is defined. The mobile station 100 transmits a random access preamble in the PRACH.

Figure 9:
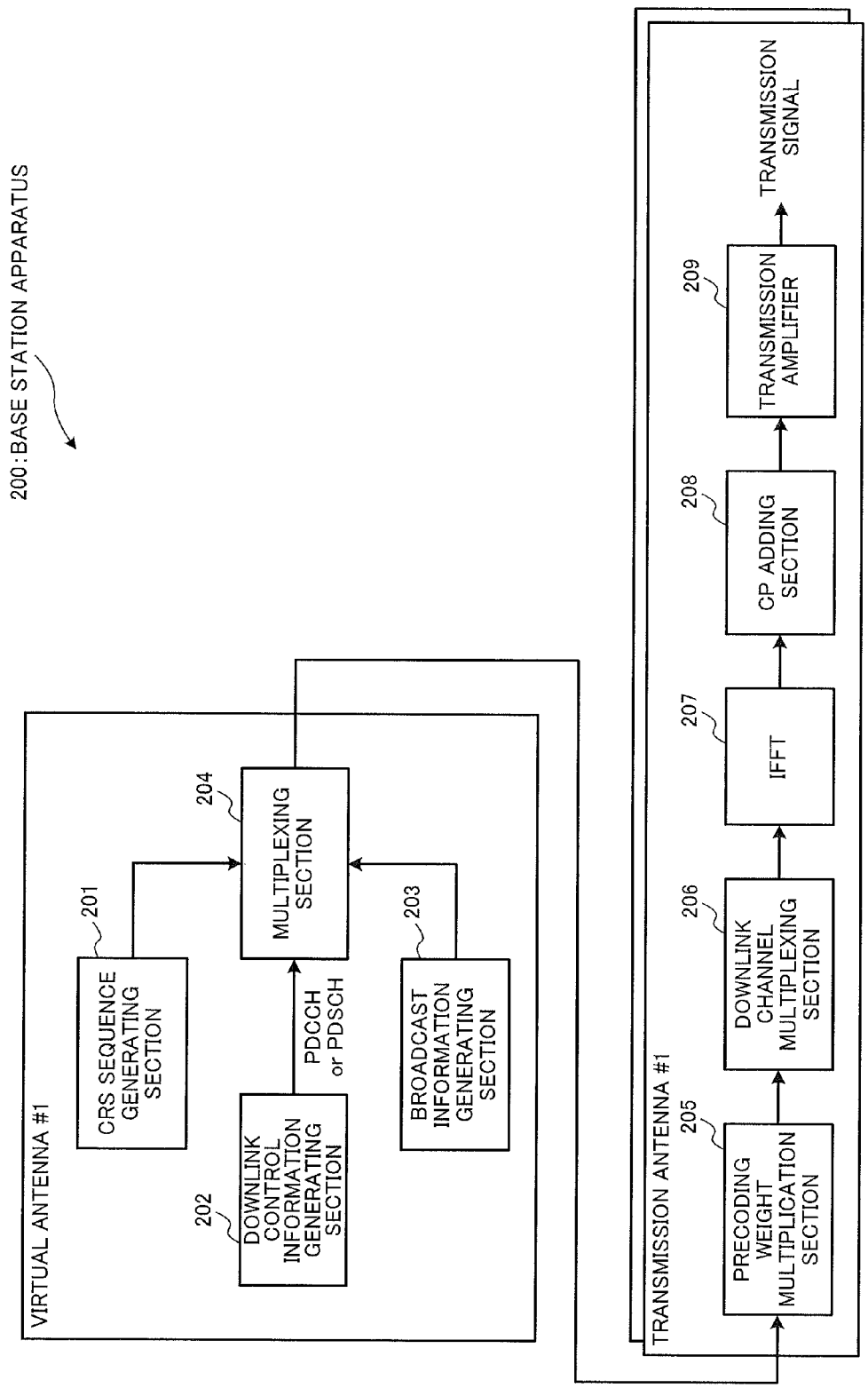
FIG. 9 is a functional block diagram of a radio base station apparatus according to an embodiment of the present invention.
Figure 10:
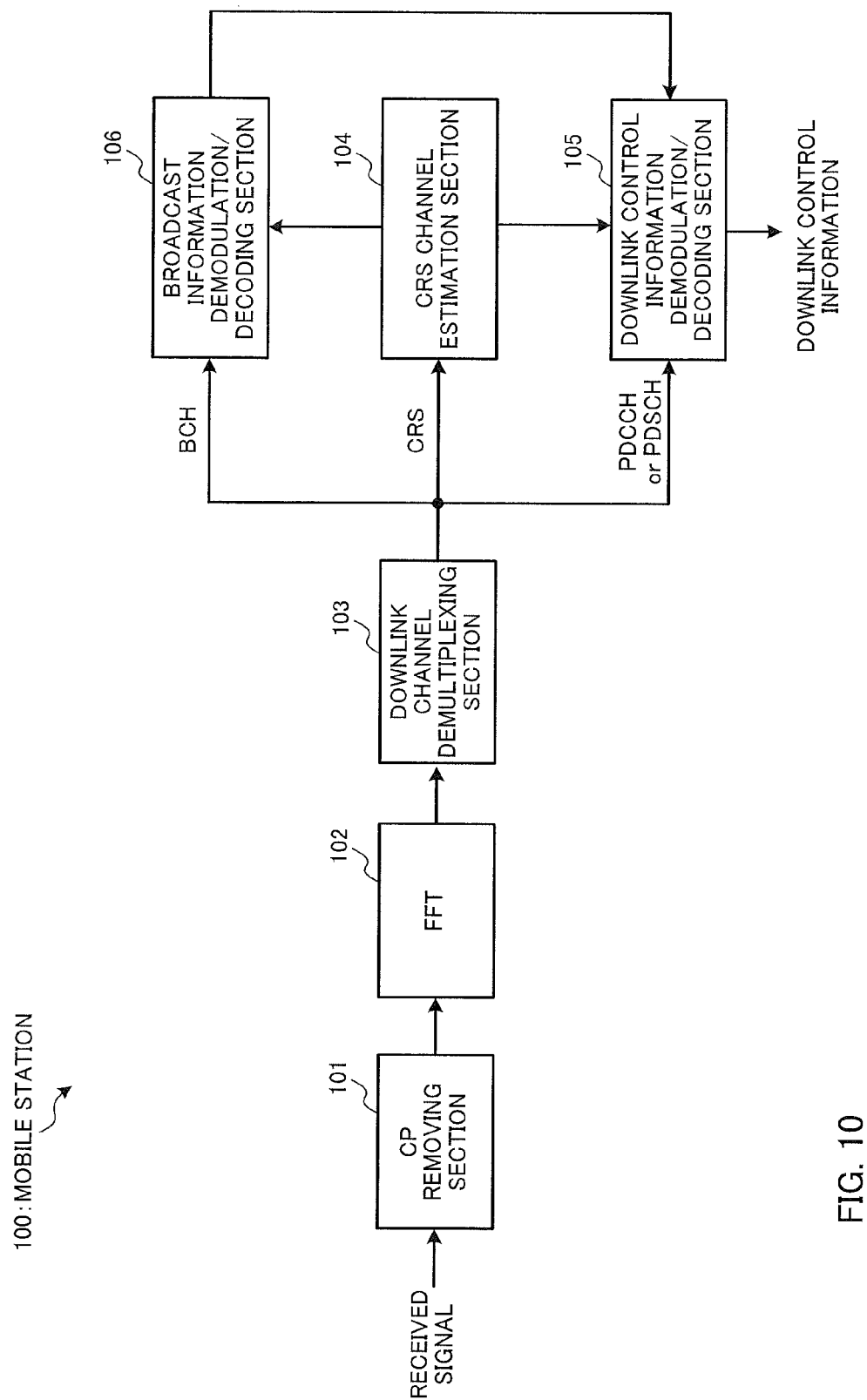
FIG. 10 is a functional block diagram of a mobile station apparatus according to an embodiment of the present invention.

Next, with reference to FIG. 9 and FIG. 10, the base station apparatus 200 and the mobile station 100 according to an embodiment of the present invention will be described. FIG. 9 is a functional block diagram of a base station apparatus 200 according to an embodiment of the present invention, and primarily shows a transmission function configuration of a baseband processing section. FIG. 10 is a functional block diagram of a mobile station 100 according to an embodiment of the present invention, and primarily shows a receiving function configuration of a baseband processing section. Note that the functional blocks of the base station apparatus 200 and the mobile station 100 shown in FIG. 9 and FIG. 10 are simplified to explain the present invention, yet are assumed to have functions which the base station apparatus 200 and the mobile station 100 should normally have.

The base station apparatus 200 according to the present embodiment has a plurality of transmitting antennas #1 to #N, and, although the PDCCH, the BCH and CRSs are precoded and transmitted from each transmitting antenna, and, physically, transmitted from all of the transmitting antennas #1 to #N, it is possible to transmit them by making a smaller number of antennas (for example, four antennas and two antennas) than all of the transmitting antennas #1 to #N virtual antennas. Note that the following description will be given assuming, for ease of explanation, that the actual number of antennas provided in the base station apparatus 200 is eight.

As shown in FIG. 9, the base station apparatus 200 has a CRS sequence generating section 201 that generates CRSs per virtual antenna, a downlink control information generating section 202 that generates downlink control information, a broadcast information generating section 203 that generates broadcast information, and a multiplexing section 204 that multiplexes the CRSs generated in the CRS sequence generating section 201, the downlink control information generated in the downlink control information generating section 202, and the broadcast information generated in the broadcast information generating section 203, over radio resources (time resources and frequency resources). Note that, although FIG. 9 only shows functional blocks related to virtual antenna #1, functional blocks to relate to other virtual antennas also have the same configurations.

Also, the base station apparatus 200 has a precoding weight multiplication section 205 that precodes signals multiplexed in the multiplexing section 204, per transmitting antenna, a downlink channel multiplexing section 206 that multiplexes the signals multiplied by precoding weights in the precoding weight multiplication section 205, over a downlink channel, an inverse fast Fourier transform section (IFFT) 207 that applies an inverse fast Fourier transform to the channel-multiplexed signal, a CP adding section 208 that attaches cyclic prefixes (CPs) to the signal after the inverse fast Fourier transform, and a transmission amplifier 209 that amplifies the signal with CPs. Note that, although FIG. 9 only shows functional blocks related to transmitting antenna #1, functional blocks to relate to other transmitting antennas also have the same configurations.

The CRS sequence generating section 201 generates CRSs to match the number of virtual antennas. For example, when the number of virtual antennas is "4," the CRS sequence generating section 201 generates CRSs #1 to #4 for four antennas. The CRSs generated in the CRS sequence generating section 201 are output to the multiplexing section 204.

The downlink control information generating section 202 generates downlink control information to match the number of virtual antennas. The downlink control information generating section 202 primarily generates downlink control information to be transmitted by the PDCCH. The downlink control information includes, for example, PDSCH and PUSCH scheduling information showing subcarrier positions allocated by a scheduler, and so on, format information such as the modulation method, the channel coding rate, and precoding information, and so on. The downlink control information that is generated in the downlink control information generating section 202 is output to the multiplexing section 204.

The broadcast information generating section 203 generates broadcast information to match the number of virtual antennas. The broadcast information generating section 203 primarily generates broadcast information to be transmitted by the BCH. The broadcast information includes, for example, information that is necessary to receive the above-described PDCCH, such as the system bandwidth and the number of transmitting antennas at the base station. The broadcast information that is generated in the broadcast information generating section 203 is output to the multiplexing section 204.

The precoding weight multiplication section 205 performs precoding of the signals multiplexed in the multiplexing section 204, with precoding weights that are determined in advance. To be more specific, the precoding section 205 precodes the PDCCH, the BCH and the CRSs using the above-described first to fourth transmission weights (precoding weights).

For example, when the first transmission weights are used, precoding is executed using matrix elements that are defined such that transmission streams are transmitted from the transmitting antennas #1 to #8 that do not overlap between the streams, and, when the second transmission weights are used, precoding is executed using matrix elements that are defined such that transmission streams are transmitted from the transmitting antennas #1 to #8 by allowing overlaps between the streams. Also, when the third transmission weights are used, precoding is execute using matrix elements that are defined such that an amount of amplitude variation and phase shift to support BPSK and QPSK between the base station apparatus 200 and the mobile station 100 is applied to each transmission stream, and, when the fourth transmission weights are used, precoding is executed using matrix elements defined in codebooks that are used for precoding of the downlink shared channel signal (PDSCH) in a MIMO system of an LTE-A scheme.

The downlink channel multiplexing section 206 multiplexes the downlink channel signals (the PDCCH, the BCH and CRSs), multiplied by precoding weights in the precoding weight multiplication section 205, and other necessary downlink channels. The channel-multiplexed signal is subjected to an inverse fast Fourier transform and converted into a time domain signal in the inverse fast Fourier transform section 207, has cyclic prefixes, which serve as guard intervals to block inter-symbol interference, attached thereto in the CP adding section 208, amplified in the transmission amplifier 209, and then transmitted.

In the base station apparatus 200, transmission processes such as described above are carried out on a per transmitting antenna basis. In this way, by performing precoding in the precoding weight multiplication section 205 per transmitting antenna using predetermined transmission weights, it is possible to implement radio communication to maintain good transmission quality even when the number of transmitting antennas provided in the base station apparatus 200 is greater than the number of transmission layers of the PDCCH, the BCH or CRSs.

The mobile station 100 according to an embodiment of the present invention will be described with reference to FIG. 10. The mobile station 100 according to the present embodiment receives a signal that is transmitted from the base station apparatus 200 on the downlink and that includes the PDCCH, the BCH or CRSs. After the PDCCH, the BCH or CRSs are demultiplexed from the received signal, the PDCCH and the BCH are used to extract downlink control information and broadcast information, and the CRSs are used for channel estimation for the shared/dedicated control channels.

As shown in FIG. 10, the mobile station 100 has a CP removing section 101 that removes the cyclic prefixes from the received signal, a fast Fourier transform section (FFT) 102 that applies a fast Fourier transform to the received signal from which the CPs have been removed, and a downlink channel demultiplexing section 103 that demultiplexes the received signal into the reference signals, the control channel and the broadcast channel.

Also, the mobile station 100 has a CRS channel estimation section 104 that performs channel estimation based on the CRSs included in the reference signals demultiplexed in the downlink channel demultiplexing section 103, a downlink control information demodulation/decoding section 105 that demodulates/decodes downlink control information from the PDCCH (or the PDSCH) included in the control channel demultiplexed in the downlink channel demultiplexing section 103, and a broadcast information demodulation/decoding section 106 that demodulates/decodes broadcast information from the BCH included in the broadcast channel demultiplexed in the downlink channel demultiplexing section 103.

The downlink channel demultiplexing section 103 performs subcarrier demapping of the received signal having been converted from signal components of a time sequence into a sequence of frequency components through the fast Fourier transform in the fast Fourier transform section 102, and demultiplexes the received signal into the reference signals, the control channel, and the broadcast channel.

In the received symbols of the reference signals demultiplexed in the downlink channel demultiplexing section 103, the CRSs are input in the CRS channel estimation section 104. Also, the PDCCH (or the PDSCH) included in the control channel demultiplexed in the downlink channel demultiplexing section 103 is input in the downlink control information demodulation/decoding section 105. Furthermore, the BCH included in the broadcast channel demultiplexed in the downlink channel demultiplexing section 103 is input in the broadcast information demodulation/decoding section 106.

The CRS channel estimation section 104 performs channel estimation for downlink coherent detection, from the received CRS information. The channel estimation result by the CRS channel estimation section 104 is passed to the downlink control information demodulation/decoding section 105 and the broadcast information demodulation/decoding section 106. The broadcast information demodulation/decoding section 106 demodulates and decodes the broadcast information based on the channel estimation result by the CRS channel estimation section 104. The broadcast information demodulated in the broadcast information demodulation/decoding section 106 is passed to the downlink control information demodulation/decoding section 105. The downlink control information demodulation/decoding section 105 demodulates and decodes the downlink control information based on the channel estimation result from the CRS channel estimation section 104 and the broadcast information from the broadcast information demodulation/decoding section 106.

In this way, in the mobile station 100, by applying antenna virtualization even when the PDCCH, the BCH or CRSs are transmitted with the actual number of transmitting antennas provided in the base station apparatus 200, it is possible to acquire the PDCCH, the BCH or the CRSs and decode the downlink control information and the broadcast information adequately, and, furthermore, perform channel estimation adequately.

Although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

For example, a case has been described with the above embodiment where an antenna virtualization technique is applied with respect to the transmission of the PDCCH, the BCH and CRSs, given the circumstance that, although a system of an LTE-A scheme supports eight-antenna transmission at a maximum, the LTE-A system nevertheless only provides for four-antenna transmission at a maximum with respect to the transmission of the PDCCH, the BCH and CRS. However, the transmission of CRSs is also applicable, from the perspective of reducing overhead.

Regarding the reception of CRSs, the mobile station 100 is able to demodulate the shared data channel or the shared control channel by receiving only one CRS. Consequently, the base station apparatus 200 does not necessarily have to transmit all CRSs to match the actual number of antennas. Consequently, instead of transmitting all CRSs to match the number of actual antennas, transmitting only a number of antennas that are made virtual antennas is preferable as an embodiment. From this perspective, with the present invention, for example, by setting the number of virtual antennas to relate to the transmission of CRSs to two antennas in the base station apparatus 200 having four or more antennas, it is possible to limit radio resources to be allocated to the CRSs to a proportion for two antennas. By this means, it is possible to reduce the number of CRSs to allocate to radio resources in accordance with the number of antennas that are made virtual antennas, and reduce overhead. Note that, since, in Rel8-LTE, the data channel signal (PDSCH) is demodulated using CRSs, when transmitting CRSs for the number of antennas that are made virtual antennas, the same antenna virtualization needs to be applied to the data channel signal as well.

The disclosure of Japanese Patent Application No. 2011-265749, filed on Dec. 5, 2011, including the specification, drawings and abstract, is incorporated herein by reference in its entirety.

The invention claimed is:

1. A radio base station apparatus comprising:
a plurality of transmitting antennas;
a weight multiplication section that, when at least one of a downlink control channel, a broadcast channel and a cell-specific reference signal is transmitted with fewer transmission layers than a number of all transmitting antennas, a smaller number of antennas than the number of all transmitting antennas are made virtual, and transmission signals are multiplied by transmission weights that make an average transmission power of each of the transmitting antennas or transmission streams the same; and
a transmission section that transmits signals multiplied by the transmission weights in the weight multiplication section from the transmitting antennas.

2. The radio base station apparatus according to claim 1, wherein the weight multiplication section multiplies transmission weights in which matrix elements are defined such that the transmission streams are transmitted from the plurality of transmitting antenna that do not overlap between the transmission streams.

3. The radio base station apparatus according to claim 2, wherein the weight multiplication section multiplies transmission weights in which matrix elements are defined such that a same signal having equal amplitude and phase are transmitted from the plurality of transmitting antennas that transmit a same transmission stream.

4. The radio base station apparatus according to claim 2, wherein the weight multiplication section multiplies transmission weights in which matrix elements are defined such that signals from the plurality of transmitting antennas that transmit a same transmission stream are applied an amount of amplitude variation and/or phase shift and transmitted.

5. The radio base station apparatus according to claim 4, wherein the weight multiplication section multiplies transmission weights in which matrix elements are defined such that transmission is performed by applying an amount of amplitude variation and phase shift that is fixed in time or in frequency.

6. The radio base station apparatus according to claim 4, wherein the weight multiplication section multiplies transmission weights in which matrix elements are defined such that transmission is performed by switching the amount of amplitude variation and phase shift randomly or periodically in time or in frequency.

7. The radio base station apparatus according to claim 1, wherein the weight multiplication section multiplies transmission weights in which matrix elements are defined such that the transmission streams are transmitted from the plurality of transmitting antenna by allowing overlaps between the transmission streams.

8. The radio base station apparatus according to claim 7, wherein the weight multiplication section multiplies transmission weights in which matrix elements are defined such that signals from the transmitting antennas are orthogonal.

9. The radio base station apparatus according to claim 8, wherein the weight multiplication section multiplies transmission weights in which matrix elements are defined such that transmission is performed by applying an amount of amplitude variation and phase shift that is fixed in time or in frequency.

10. The radio base station apparatus according to claim 8, wherein the weight multiplication section multiplies transmission weight in which matrix elements are defined such that transmission is performed by switching an amount of amplitude variation and phase shift randomly or periodically in time or in frequency.

11. The radio base station apparatus according to claim 1, wherein the weight multiplication section multiplies transmission weights in which matrix elements are defined such that an amount of amplitude variation and phase shift to support BPSK or QPSK between the radio base station apparatus and user equipment is applied to each transmission stream.

12. The radio base station apparatus according to claim 1, wherein the weight multiplication section multiplies transmission weights that are defined in a first codebook for a long cycle/wide band and in a second codebook for a short cycle/narrow band, which are used for MIMO transmission of downlink shared channel data.

13. The radio base station apparatus according to claim 1, wherein the weight multiplication section multiplies transmission weights in which matrix elements are defined such that transmission is performed by applying different amounts of cyclic delay to a same signal between the plurality of transmitting antennas that transmit a same transmission stream.

14. The radio base station apparatus according to claim 1, wherein the transmitting antenna having low correlation with each other are selected as the plurality of transmitting antenna to transmit a same transmission stream.

15. The radio base station apparatus according to claim 14, wherein the plurality of transmitting antenna are formed with linear polarization antennas, and a plurality of antenna elements that are physically apart are selected as the plurality of transmitting antennas to transmit the same transmission stream.

16. The radio base station apparatus according to claim 14, wherein the plurality of transmitting antennas are formed with orthogonal polarization antennas, and one or a plurality of different polarization elements are selected as the plurality of transmitting antennas to transmit the same transmission stream.

17. The radio base station apparatus according to claim 1, wherein the transmitting antennas having high correlation with each other are selected as the plurality of transmitting antennas to transmit a same transmission stream.

18. The radio base station apparatus according to claim 17, wherein the plurality of transmitting antennas are formed with linear polarization antennas, and a plurality of antenna elements that are physically close are selected as the plurality of transmitting antennas to transmit the same transmission stream.

19. The radio base station apparatus according to claim 17, wherein the plurality of transmitting antennas are formed with orthogonal polarization antennas, and one or a plurality of same polarization elements are selected as the plurality of transmitting antennas to transmit the same transmission stream.

20. A radio communication system comprising:
a radio base station apparatus comprising:
a plurality of transmitting antennas;
a weight multiplication section that, when at least one of a downlink control channel, a broadcast channel and a cell-specific reference signal is transmitted with fewer transmission layers than a number of all transmitting antennas, a smaller number of antennas than the number of all transmitting antennas are made virtual, and transmission signals are multiplied by transmission weights that make an average transmission power of each of the transmitting antennas or transmission streams the same; and
a transmission section that transmits signals multiplied by the transmission weights in the weight multiplication section from the transmitting antennas; and
a mobile station apparatus comprising:
a receiving section that receives the signals from the radio base station apparatus; and
a downlink channel demultiplexing section that demultiplexes the received signals received in the receiving section, into the reference signal, the control channel and the broadcast channel.

21. A radio communication method comprising the steps of:
when, from a radio base station apparatus having a plurality of transmitting antennas, at least one of a downlink control channel, a broadcast channel and a cell-specific reference signal is transmitted with fewer transmission layers than a number of all transmitting antennas, making a smaller number of antennas than the number of all transmitting antennas virtual, and multiplying transmission signals by transmission weights that make an average transmission power of each of the transmitting antennas or transmission streams the same; and
transmitting signals multiplied by the transmission weights from the transmitting antennas.

* * * * *